(12) United States Patent
Reilly

(10) Patent No.: US 8,503,201 B2
(45) Date of Patent: Aug. 6, 2013

(54) TRANSIENT CLAMPING CIRCUITRY FOR VOLTAGE CONVERTER

(75) Inventor: David E. Reilly, Concord, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 547 days.

(21) Appl. No.: 12/630,279

(22) Filed: Dec. 3, 2009

(65) Prior Publication Data

US 2011/0133557 A1    Jun. 9, 2011

(51) Int. Cl.
*H02H 7/125* (2006.01)
*H02M 7/00* (2006.01)

(52) U.S. Cl.
USPC ............................................ 363/52; 363/125

(58) Field of Classification Search
USPC ..................... 363/123, 125, 126; 307/126
See application file for complete search history.

(56) References Cited

U.S. PATENT DOCUMENTS

| | | |
|---|---|---|
| 4,114,048 A | 9/1978 | Hull et al. |
| 4,310,866 A | 1/1982 | Wirth |
| 4,564,767 A | 1/1986 | Charych |
| 4,674,031 A | 6/1987 | Siska, Jr. |
| 4,683,529 A | 7/1987 | Bucher, II |
| 4,763,013 A | 8/1988 | Gvoth, Jr. et al. |
| 4,782,241 A | 11/1988 | Baker et al. |
| 4,816,982 A | 3/1989 | Severinsky |
| 4,831,508 A | 5/1989 | Hunter |
| 4,860,185 A | 8/1989 | Brewer et al. |
| 4,903,186 A | 2/1990 | Pullen, Jr. |
| 4,943,902 A | 7/1990 | Severinsky |
| 4,964,029 A | 10/1990 | Severinsky et al. |
| 4,980,812 A | 12/1990 | Johnson, Jr. et al. |
| 5,019,717 A | 5/1991 | McCurry et al. |
| 5,047,913 A | 9/1991 | De Doncker et al. |
| 5,099,410 A | 3/1992 | Divan |
| 5,126,585 A | 6/1992 | Boys |
| 5,172,309 A | 12/1992 | DeDoncker et al. |
| 5,315,533 A | 5/1994 | Stich et al. |
| 5,351,179 A | 9/1994 | Tsai et al. |
| 5,465,011 A | 11/1995 | Miller et al. |
| 5,541,828 A | 7/1996 | Rozman |
| 5,559,685 A | 9/1996 | Lauw et al. |
| 5,579,197 A | 11/1996 | Mengelt et al. |
| 5,581,450 A | 12/1996 | Walne |
| 5,587,685 A | 12/1996 | Johansson |
| 5,602,462 A | 2/1997 | Stich et al. |
| 5,615,094 A | 3/1997 | Cosentino et al. |
| 5,684,686 A | 11/1997 | Reddy |
| 5,684,688 A | 11/1997 | Rouaud et al. |

(Continued)

OTHER PUBLICATIONS

International Search Report from corresponding PCT application No. PCT/US2011/058712.

(Continued)

*Primary Examiner* — Adolf Berhane
*Assistant Examiner* — Emily Pham
(74) *Attorney, Agent, or Firm* — Lando & Anastasi, LLP

(57) ABSTRACT

Systems and methods of operating a voltage converter are provided. The converter includes an output inductor and an output capacitor coupled to a rectifier circuit. The converter also includes a clamp circuit having a clamping diode and a clamping capacitor coupled in series, with the serial combination in parallel with the output inductor. The clamp circuit can also include a recovery inductor coupled to the output capacitor, and a switch configured to selectively couple and decouple the recovery inductor in parallel with the clamping capacitor.

11 Claims, 6 Drawing Sheets

U.S. PATENT DOCUMENTS

| | | | |
|---|---|---|---|
| 5,834,924 | A | 11/1998 | Konopka et al. |
| 5,877,947 | A | 3/1999 | Chen et al. |
| 5,943,224 | A * | 8/1999 | Mao ............................ 363/52 |
| 5,982,652 | A | 11/1999 | Simonelli et al. |
| 6,046,920 | A | 4/2000 | Cazabat et al. |
| 6,069,412 | A | 5/2000 | Raddi et al. |
| 6,184,593 | B1 | 2/2001 | Jungreis |
| 6,201,319 | B1 | 3/2001 | Simonelli et al. |
| 6,259,235 | B1 * | 7/2001 | Fraidlin et al. ............... 323/222 |
| 6,353,547 | B1 | 3/2002 | Jang et al. |
| 6,381,156 | B1 | 4/2002 | Sakai et al. |
| 6,400,591 | B2 | 6/2002 | Reilly et al. |
| 6,404,658 | B1 | 6/2002 | Reilly |
| 6,486,430 | B2 * | 11/2002 | Naor ......................... 219/121.44 |
| 6,630,751 | B2 | 10/2003 | Curtis et al. |
| 6,630,752 | B2 | 10/2003 | Fleming et al. |
| 6,728,119 | B2 | 4/2004 | Reilly et al. |
| 6,738,915 | B1 | 5/2004 | Mott et al. |
| 6,757,185 | B2 | 6/2004 | Rojas Romero |
| 6,765,373 | B1 | 7/2004 | Harvey et al. |
| 6,903,537 | B2 | 6/2005 | Tzeng et al. |
| 6,944,036 | B2 | 9/2005 | Yan et al. |
| 7,099,134 | B2 * | 8/2006 | Ying et al. ..................... 361/91.7 |
| 7,106,605 | B2 | 9/2006 | Chen et al. |
| 7,126,409 | B2 | 10/2006 | Nielsen |
| 7,352,083 | B2 | 4/2008 | Nielsen et al. |
| 7,432,615 | B2 | 10/2008 | Hjort |
| 7,446,433 | B2 | 11/2008 | Masciarelli et al. |
| 2002/0044459 | A1 * | 4/2002 | Tsubota et al. ............... 363/16 |
| 2002/0044469 | A1 | 4/2002 | Yasumura |
| 2002/0126518 | A1 | 9/2002 | Lazarovich |
| 2002/0191425 | A1 | 12/2002 | Geissler |
| 2003/0031037 | A1 | 2/2003 | Piaskowski |
| 2003/0048006 | A1 | 3/2003 | Shelter, Jr. et al. |
| 2003/0142513 | A1 | 7/2003 | Vinciarelli |
| 2004/0240239 | A1 * | 12/2004 | Ying et al. ..................... 363/52 |
| 2005/0024803 | A1 | 2/2005 | Ying et al. |
| 2005/0162019 | A1 | 7/2005 | Masciarelli et al. |
| 2007/0064363 | A1 | 3/2007 | Nielsen et al. |
| 2007/0164613 | A1 * | 7/2007 | Yamada et al. ................ 307/66 |
| 2007/0195566 | A1 | 8/2007 | Nielsen et al. |
| 2007/0228837 | A1 | 10/2007 | Nielsen et al. |
| 2008/0042491 | A1 | 2/2008 | Klikic et al. |
| 2008/0067872 | A1 | 3/2008 | Moth |
| 2008/0157601 | A1 | 7/2008 | Masciarelli et al. |
| 2008/0165461 | A1 | 7/2008 | Paik et al. |
| 2009/0160254 | A1 | 6/2009 | Wu et al. |
| 2011/0057639 | A1 * | 3/2011 | Chung et al. ................... 323/311 |

OTHER PUBLICATIONS

Liu: "Comparative Study of Snubber Circuits for DC-DC Converters Utilized in High Power Off-Line Power Supply Applications", Applied Power Electronics Conference and Exposition, 1999. APEC '99. Fourteenth Annual Dallas, TX, USA Mar. 14-18, 1999, Piscataway, NJ USA, IEEE, US, vol. 2 Mar. 14, 1999, pp. 821-826, XP010323615, ISBN: 978-0-7803-5160-8.

Liu et al.: "A novel energy recycling clamp circuit", Applied Power Electronics Conference and Exposition, 2005. Twentieth Annual IEEE, Austin, TX, USA Mar. 6-10, 2005, Piscataway, NJ USA, IEEE, US, vol. 2, Mar. 6, 2005, pp. 1205-1209 vol. 2, XP010809449, DOI: 10.1109/APEC.2005.1453154, ISBN: 978-0-7803-8975-5.

* cited by examiner

TRANSIENT CLAMPING CIRCUITRY FOR VOLTAGE CONVERTER

BACKGROUND OF THE INVENTION

1. Field of Invention

At least one embodiment of the present invention relates generally to control of a converter, and more specifically, to control of a converter associated with at least one of a DC power supply, an AC power supply, or a frequency converter.

2. Discussion of Related Art

Converters that may form at least part of uninterruptible power supplies (UPS), frequency converters, or filters are used to provide reliable power to many different types of electronic equipment. Often, this electronic equipment requires particular voltage and/or current input from a converter. Unwanted voltage and current transients within the converter can shorten the life of converter components, or pass through to converter output and be applied to electrical equipment. This can result in inefficient operation, oversizing of components, electromagnetic interference (EMI), and can require costly repair or replacement of electrical components.

SUMMARY OF THE INVENTION

The aspects and embodiments of the present invention are directed to systems and methods of operating voltage converters. To increase efficiency and reduce cost, a non dissipative clamp circuit of a converter limits the maximum voltage developed across the output rectifiers and seen at the input to the converter's output inductor. Transient voltages can be diverted to a capacitor of the clamp circuit, and a switch is controlled to transfer the energy associated with this voltage from the clamping capacitor to a recovery inductor. The switch is further controlled to allow this energy to automatically transfer to the output capacitor of the converter. Accordingly, energy from transient voltages or other voltage spikes can be captured and provided to the converter's output.

At least one aspect is directed to a voltage converter that includes a rectifier circuit, an output inductor, and an output capacitor coupled to the rectifier circuit. The voltage converted can also include a clamp circuit having a clamping diode and a clamping capacitor coupled in a serial combination, with the serial combination coupled in parallel with the output inductor. The clamp circuit can also include a recovery inductor coupled to the output capacitor, and a switch configured to selectively couple and decouple the recovery inductor in parallel with the clamping capacitor.

At least one other aspect is directed to a method of clamping a transient voltage in a voltage converter having a rectifier circuit. The method includes detecting a transient voltage of the voltage converter, controlling a switch to connect in parallel a clamping capacitor charged by the transient voltage with a recovery inductor, and transferring energy from the recovery inductor to an output capacitor of the voltage converter.

At least one other aspect is directed to an uninterruptable power supply that includes an AC power input, a battery, an output configured to provide power from at least one of the AC power input and the battery to an uninterruptable power supply output and a DC/DC converter coupled to the battery. The DC/DC converter can include a rectifier circuit, an output inductor and an output capacitor coupled to the rectifier circuit, and a clamp circuit. The clamp circuit can include a clamping diode and a clamping capacitor coupled in a serial combination with the serial combination coupled in parallel with the output inductor, a recovery inductor coupled to the output capacitor, and a switch configured to selectively couple and decouple the recovery inductor in parallel with the clamping capacitor.

At least one other aspect is directed to a voltage converter. The voltage converter can include a rectifier circuit, and output inductor coupled to the rectifier circuit, and a clamp circuit. The clamp circuit can include a clamping diode and a clamping capacitor coupled in a serial combination, with the serial combination coupled in parallel with the output inductor. The clamp circuit can also include a recovery inductor coupled to the output capacitor, and means for reversibly coupling the recovery inductor with the clamping capacitor to provide energy to the output capacitor.

In some embodiments, the rectifier circuit includes a full wave rectifier circuit having a first diode, a second diode, a third diode, and a fourth diode, and a snubber circuit. The snubber circuit can include a resistor and a capacitor, where a first terminal of the snubber circuit is coupled to an anode of the first diode and a cathode of the second diode, and where a second terminal of the snubber circuit is coupled to an anode of the third diode and a cathode of the fourth diode. The clamping diode can be configured to conduct a current when a voltage of the output inductor is substantially equal to a predetermined voltage. The clamping diode can also be configured to conduct a current when a voltage of at least one of the first, second, third, and fourth diodes is substantially equal to a predetermined threshold voltage associated with a transient voltage.

In some embodiments, the converter can be configured so that a voltage of the output inductor is less than a peak value of a transient voltage. A controller of the converter can be configured to change a state of the switch from an open position to a closed position when a voltage of the clamping capacitor is based on the transient voltage. The controller can also be configured to change a state of the switch from a closed position to an open position when a voltage of the recovery inductor is based on the transient voltage.

In at least one embodiment, the clamp circuit includes a recovery diode, where a cathode of the recovery diode is coupled to the recovery inductor and to the switch, and where an anode of the recovery diode is coupled to the output capacitor. The recovery diode can be configured to conduct a current when a voltage of the recovery inductor is based on the transient voltage and when the switch is in an open position. The recovery inductor and the recovery diode can also be configured in operation of the converter to transfer energy to the output capacitor when the switch is in an open position.

Other aspects, embodiments, and advantages of these exemplary aspects and embodiments will become apparent from the following detailed description, taken in conjunction with the accompanying drawings, illustrating the principles of the invention by way of example only. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
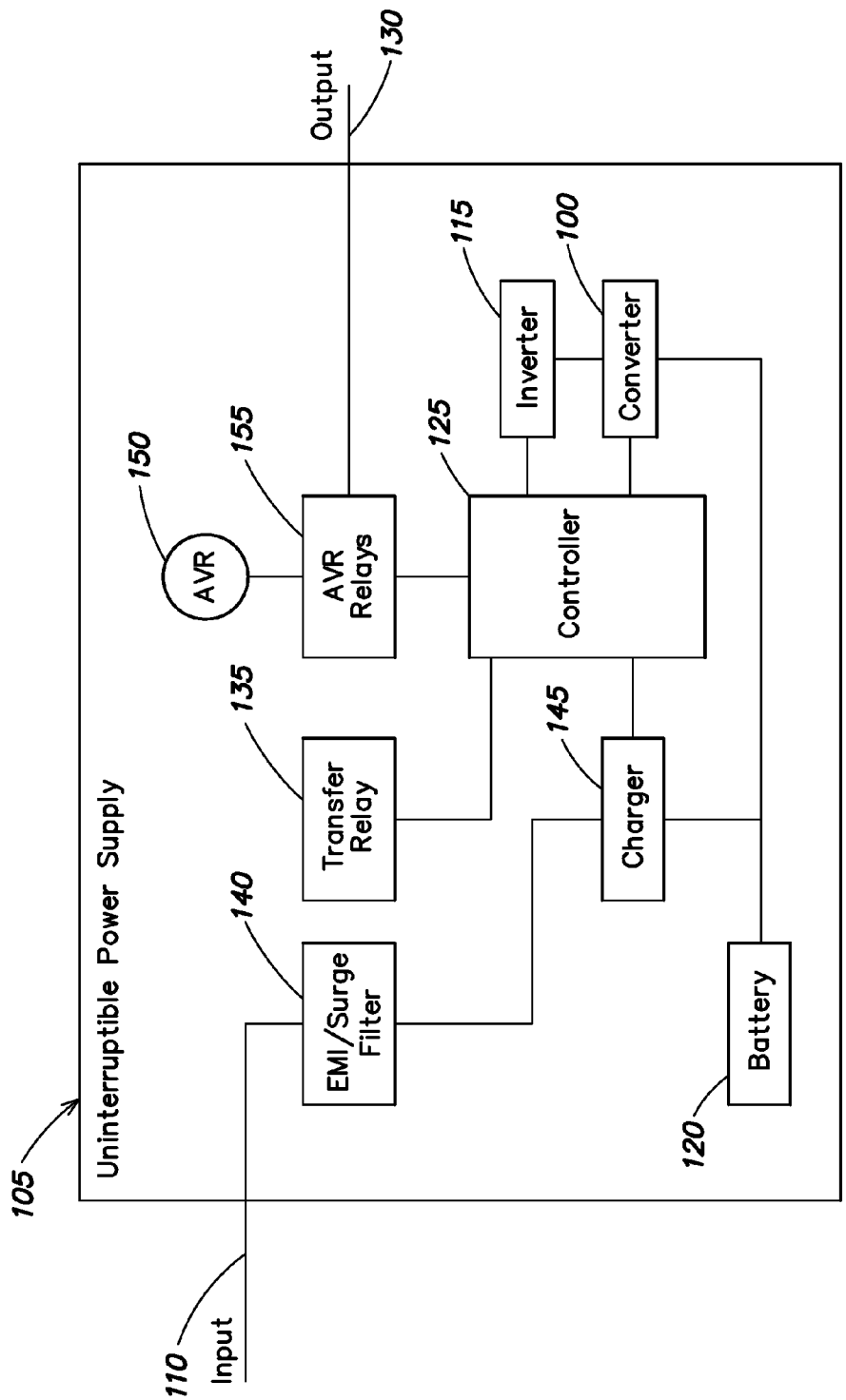
FIG. 1 is a functional block diagram depicting a converter that forms part of an uninterruptable power supply in accordance with an embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

At least some aspects and embodiments are directed to a voltage converter that includes a clamp circuit. The clamp circuit can include at least a clamping diode, a clamping capacitor, a recovery inductor, a recovery diode, a switch, and a controller. The clamp circuit can prevent transient voltages in secondary circuits of the converter from exceeding a threshold value. For example, voltage at a rectifier diode of the converter may spike after the reverse recovery period of the rectifier diode. In this example, a leading edge of the voltage spike (e.g., a transient voltage) will cause the clamping diode to conduct current through the clamp circuit, charging the clamping capacitor. The switch, responsive to a signal from the controller, couples the clamping capacitor to the recovery inductor when the clamping capacitor is at least partially charged. This electrical coupling causes energy from the clamping capacitor to transfer to the recovery inductor and subsequently to an output capacitor and/or load. In this example, at least some of the energy associated with the transient voltage spike of the rectifier diode is recovered and applied to the converter output, and not dissipated via resistors or otherwise wasted.

FIG. 1 is a functional block diagram of a line interactive uninterruptable power supply (UPS) 105 for providing AC power to a load in accordance with an embodiment. In one embodiment, UPS 105 includes an input 110 to receive AC power from an AC power source, an output 130 that provides AC power, a battery 120 coupled to DC to DC converter 100, an inverter 115 operatively coupled to converter 100 to receive DC power and to provide AC power, a transfer relay 135 selectively coupled to input 110 and inverter 115, an EMI/Surge filter 140, a battery charger 145 and an automatic voltage regulation (AVR) transformer 150 coupled to the transfer relay 135, and at least one AVR relay 155. Uninterruptable power supply 105 further includes at least one controller 125 that can monitor and control operation of UPS 105.

In one embodiment, AVR transformer 150 and its associated relays allow UPS 105 to operate over a wider range of input voltages.

In one embodiment, UPS 105 receives input AC power from an AC power source through input 110, filters the input AC power and provides filtered AC power to transfer relay 135, which can receive both the filtered power and power from inverter 115. Controller 125 can control transfer relay 135 to provide power from the AC power source to output 130 when, for example, controller 125 determines that available input AC power is within a tolerance range. When input AC power is not within a tolerance range, or above or below a threshold due for example to power surges, brown out or black out conditions, controller 125 can control transfer relay 135 to provide power from inverter 115.

Inverter 115 can receive DC power from converter 100, convert the DC power to AC power, and regulate the AC power based on predetermined specifications. For example, depending on battery 120 capacity and power requirements of a load coupled to output 130, UPS 105 can provide power to the load during brief power source dropouts or for extended power outages.

Using data stored in an associated memory, controller 125 can perform one or more instructions to monitor and control operation of UPS 105. For example, controller 125 can include at least one processor or other type of controller. In one embodiment, controller 125 can include at least one commercially available processor. Controller 125 may also include at least one application specific integrated circuit (ASIC) to perform at least a portion of the operations disclosed herein. It is appreciated that controller 125 may include multiple combinations of hardware and software components.

Memory associated with controller 125 can include data storage that stores computer readable and writable information associated with UPS 105 operation. This information may include, for example, data subject to manipulation or processing by controller 125 and instructions executable by controller 125. Data storage associated with controller 125 can include relatively high performance, volatile, random access memory such as a dynamic random access memory (DRAM) or static memory (SRAM) or may be a nonvolatile storage media such as magnetic disk or flash memory devices. Data storage devices and stored data accessed by controller 125 can be organized into particular and, in some cases, unique structures to perform the aspects and embodiments described herein. These data structures may be configured, for example, to conserve storage space or increase data exchange performance.

Figure 2:
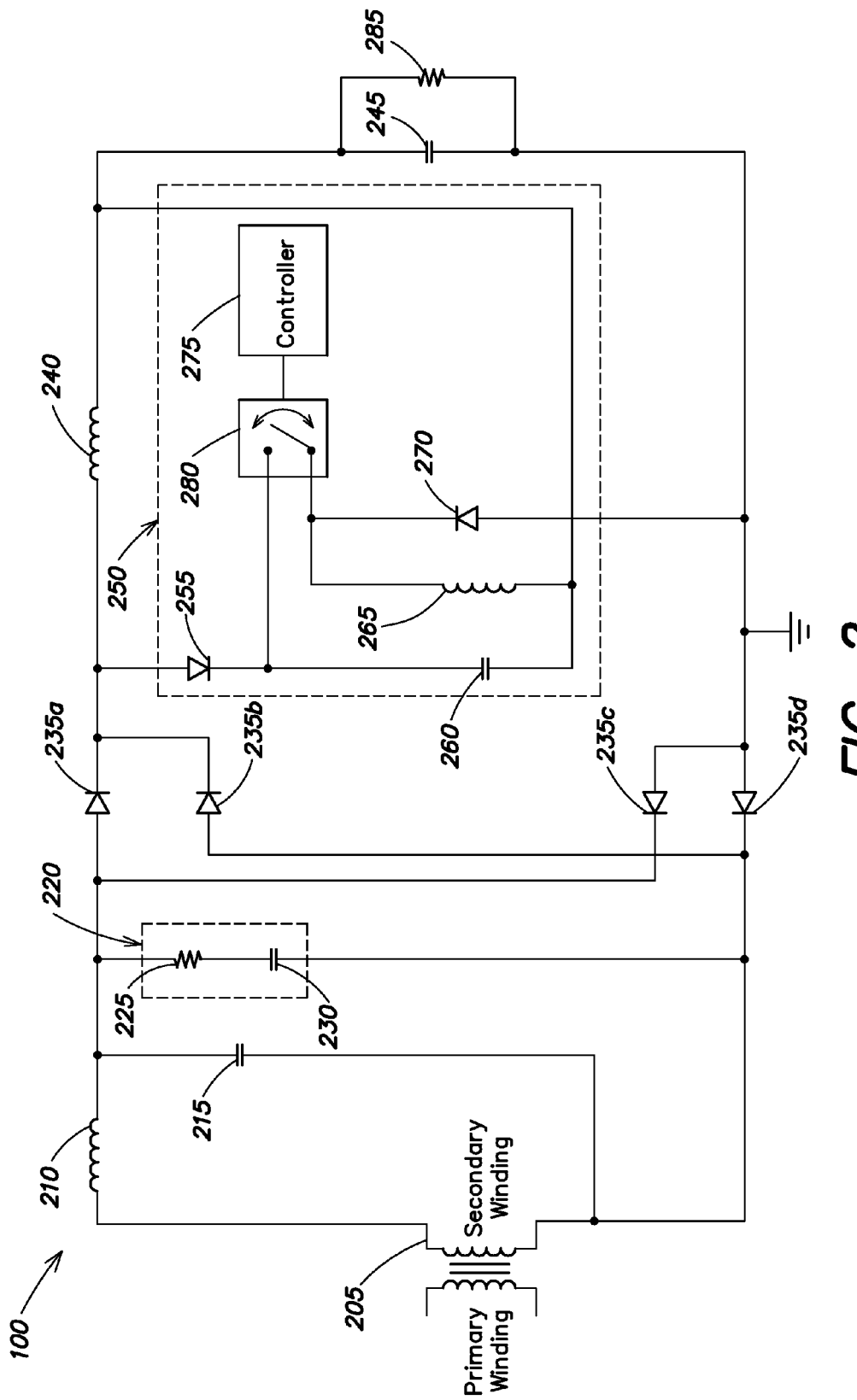
FIG. 2 is a schematic diagram depicting a converter in accordance with an embodiment.

FIG. 2 is a schematic diagram depicting a portion of converter 100 in accordance with an embodiment. The portion of converter 100 illustrated in FIG. 2 generally includes the secondary side converter circuit components. In one embodiment, converter 100 is a DC/DC converter that stabilizes a DC voltage and can step its output voltage up or down with respect to its input voltage, thus converting DC voltage from one level to another. In one embodiment, converter 100 includes at least one transformer 205 that connects the primary side of converter 100 (not shown in FIG. 2) with the secondary side. In one embodiment, transformer 205 is a high frequency transformer with a ferrite core, although other transformers, (e.g., low frequency) may also be used. It is appreciated that converter 100 need not include transformer 205. For example, converter 100 may form part of a transformer-less buck regulator circuit.

As illustrated in FIG. 2, leakage inductance is represented at least in part by leakage inductor 210, and parasitic capacitance is represented at least in part by capacitor 215. Snubber circuit 220 can dampen parasitic oscillations (e.g., ripple current) that may exist on the secondary side of converter 100. As illustrated in FIG. 2, snubber circuit 220 may include at least one resistor 225 coupled in series with at least one capacitor 230, although other configurations and filtering circuits are possible.

In one embodiment, converter 100 includes a plurality of rectifier diodes 235 in a full wave bridge configuration, as illustrated in FIG. 2. For example, a first terminal of the secondary winding of transformer 205 can be coupled to the anode of a first rectifier diode 235a and the cathode of a second rectifier diode 235c, with the second terminal of the secondary winding of transformer 205 coupled to the anode of a third rectifier diode 235b and the cathode of a fourth rectifier diode 235d, as illustrated in FIG. 2. This full wave bridge configuration may also be described with respect to snubber circuit 220 or other converter 100 components. For example, and also as illustrated in FIG. 2, a first terminal of snubber circuit 220 can couple to the anode of a first rectifier diode 235a and the cathode of a second rectifier diode 235c, and a second terminal of snubber circuit 220 can couple to the anode of a third rectifier diode 235b and the cathode of a fourth rectifier diode 235d. It is appreciated that the couplings between converter 100 components may, but need not, be direct connections, and that intervening circuit components may form part of the connection. Other configurations are possible. For example, converter 100 can have rectifier diodes 235 in a half wave rectifier or full wave Center Tapped configuration.

In one embodiment, transient voltages can appear at one or more rectifier diodes 235a-d. These voltage spikes can cause device breakdown and shorten the life of converter 100 components. For example, the reverse recovery period of rectifier diode 235 occurs when the forward biasing voltage of rectifier diode 235 is changed to a negative biasing voltage. This can cause rectifier diode 235 to conduct current for a period of time from the cathode to the anode.

In one embodiment, converter 100 includes at least one clamp circuit 250. In one embodiment, clamp circuit 250 includes at least one clamping diode 255 and at least one clamping capacitor 260. For example, clamping diode 255 and clamping capacitor 260 may be configured in parallel with output inductor 240, as illustrated in FIG. 2. Clamp circuit 250 can also include at least one recovery inductor 265 and at least one recovery diode 270, as well as at least one controller 275 and at least one switch 280. In one embodiment, switch 280 includes at least one transistor, such as a Metal Oxide Semiconductor Field Effect Transistor (MOSFET), other Field Effect Transistor, Insulated Gate Bipolar Transistor, or Bipolar Junction Transistor. Controller 275 may be a dedicated processor or be part of a processor used to control a power supply system containing converter 100, such as controller 125 shown in FIG. 1. In one embodiment, controller 275 includes a comparator circuit and a one shot pulse generator.

In one embodiment, the clamping diode 255 clamps the voltage of output inductor 240 so that it does not exceed a threshold voltage. This threshold voltage may be indicative of a transient voltage, (e.g., greater than a normal operating output inductor voltage and less than a peak value of a transient voltage). In one embodiment, when output inductor 240 voltage reaches the threshold voltage, clamping diode 255 becomes forward biased and conducts current, charging clamping capacitor 260 and clamping the voltage of output inductor 240 to the predetermined threshold voltage. In this example, switch 280 is in the open position as illustrated in FIG. 2. Clamping diode 255 may also conduct current when a voltage of at least one of rectifier diodes 235 reaches a predetermined threshold voltage associated with the transient voltage. For example, the predetermined threshold voltage may indicate that a transient voltage spike has begun. In one embodiment, when the current in the secondary winding of transformer 205 drops to a level that is about equal to the current in output inductor 240, clamping diode 255 stops conducting current.

When clamping capacitor 260 is charged, controller 275 can switch the state of switch 280 to a closed position, for example by applying a one shot pulse control signal to switch 280. This may occur, for example, a predetermined time period after detection of any of a transient voltage, reverse recovery period, forward biasing of clamping diode 255, or detection of a threshold voltage indicative of a transient voltage spike at output inductor 240. This predetermined time generally includes sufficient time for at least part of the transient voltage to be applied to the clamping capacitor. Switch 280, when in a closed position, completes the electrical connection between clamping capacitor 260 and recovery inductor 265 so that energy from the charged clamping capacitor 260 can transfer to recovery inductor 265. In one embodiment, after this transfer, switch 280, under the control of controller 275, can again switch to the open position, which causes current to follow a path from recovery inductor 265 to converter output capacitor 245 via recovery diode 270.

Thus, in one embodiment output inductor 240 voltage remains at or below a threshold voltage, and transient voltage spikes above this threshold value bias clamping diode 255 to charge clamping capacitor 260. When clamping capacitor 260 is charged, (e.g., after expiration of a time period that begins when a transient voltage is detected or generated) switch 280 changes from an open to a closed position. This creates a connection between clamping capacitor 260 and recovery inductor 265, and the energy from clamping capacitor 260 is transferred to recovery inductor 265. Continuing with this illustrative embodiment, subsequent to this transfer, switch 280 reverts from the closed to the open position, causing the energy from recovery inductor 265 to be transferred to output capacitor 245, where it can be applied to load 285.

It is appreciated that clamping diode 255 clamps the voltage of output inductor 240 to a maximum level, for example within manufacturing tolerances of output inductor 240. When output inductor 240 has a voltage less than the clamp, or maximum voltage, clamping diode 255 in one embodiment generally does not conduct current, and current output from rectifier diodes 235 charges output capacitor 245 via output inductor 240. Further, using energy associated with the transient voltage to charge clamping capacitor 260, and controlled switching of clamp circuit 250 to transfer energy from clamping capacitor 260 to recovery inductor 265, and additional controlled switching to charge output capacitor 245 with energy from recovery inductor 265, provides an essentially lossless system where energy associated with transient voltages is applied to converter 100 output (e.g., output capacitor 245 or load 285, which may be the input to inverter 115 as illustrated in FIG. 1), and not wasted, for example in the form of heat dissipated through one or more resistors.

Figure 3:
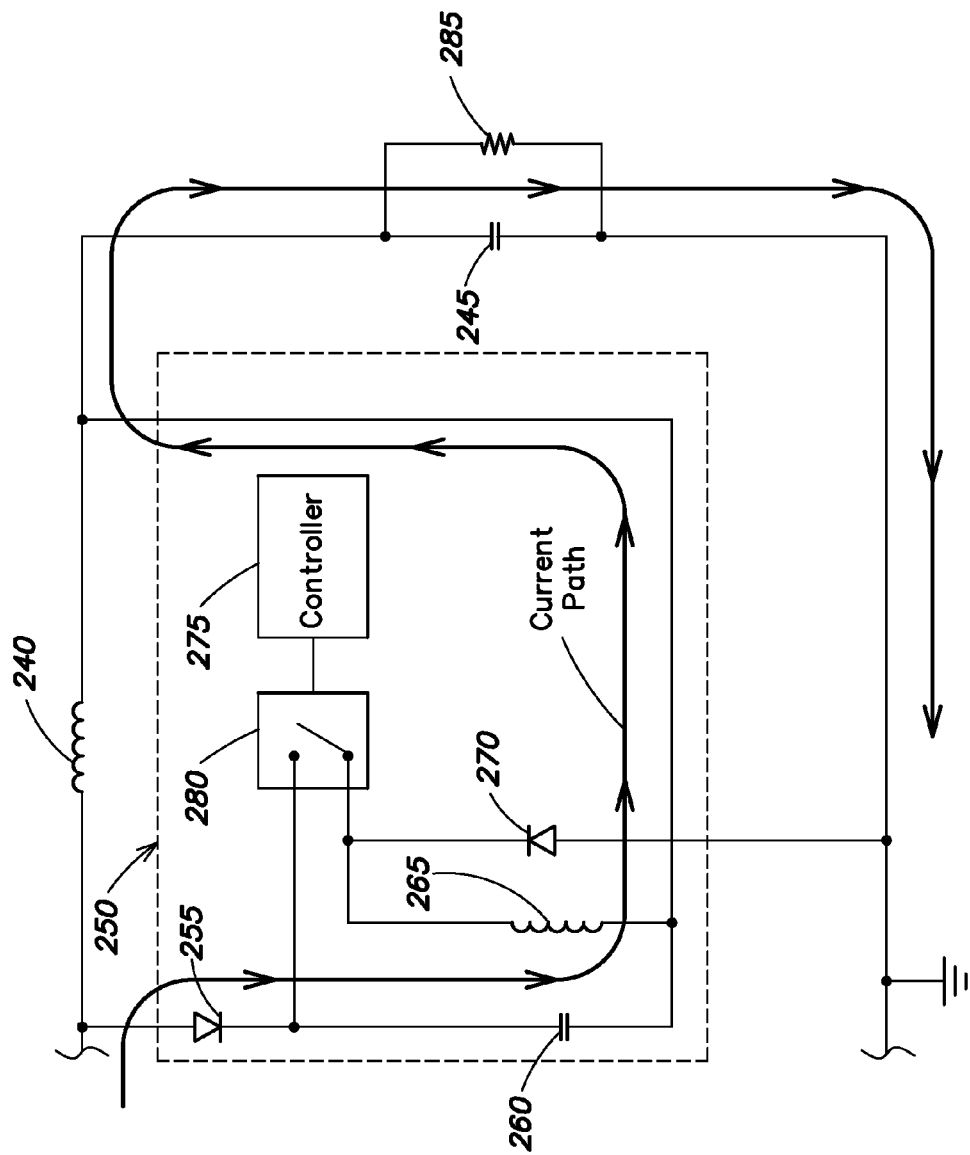
FIG. 3 is a schematic diagram depicting a converter when a clamping diode conducts current in accordance with an embodiment.

FIG. 3 is a schematic diagram depicting converter 100 in accordance with an embodiment. In particular, FIG. 3 illustrates a portion of converter 100 when switch 280 is in an open position and when clamping diode 255 is conducting current that charges clamping capacitor 260. Further, when switch 280 is open, as illustrated in FIG. 3, recovery inductor 265 is electrically coupled to output capacitor 245, so that energy present in recovery inductor 265 can be transferred to output capacitor 245. In one embodiment, recovery inductor 265 current may be zero, or substantially zero, at the beginning of each half cycle during the time when clamping capacitor 260 is charging via clamping diode 255.

In one embodiment, converter 100 has the configuration as illustrated in FIG. 3 after the reverse recovery time period of rectifier diodes 235 (not shown in FIG. 3) or during the time period of a transient voltage spike that is higher than a threshold voltage of output inductor 240. In this illustrative embodiment, transient voltage spikes above a threshold amount can be applied to clamping capacitor 260 and not to output inductor 240. In one embodiment, clamping diode 255 conducts current that charges clamping capacitor 260 during a time period associated with a transient voltage. For example, the voltage of clamping capacitor 260 may be 360V when charged during a transient voltage period. Other voltages, greater than and less than 360V are possible.

In one embodiment, controller 275 includes a timing circuit to determine a time delay period after detection of a transient voltage spike. In one embodiment, this time delay period is approximately 0.8 µs. For example, controller 275 can monitor output inductor 240 voltage to detect a transient voltage spike. Clamping diode 255 begins to conduct, and a voltage based on the transient voltage is applied to clamping capacitor 260. Controller 275 can also determine the existence of a transient voltage of converter 100 when, for example, the voltage at output inductor 240 reaches a threshold value that is less than the peak transient voltage spike.

The transient voltage spike can charge clamping capacitor 260 within a time period based on the characteristics of converter 100 components, such as within approximately 1 µs of the detection of the transient voltage. Other time periods are possible, and controller 275 may maintain switch 280 in the open position as illustrated in FIG. 3 for any time period sufficient to charge capacitor 260. In one embodiment, controller 275 detects a transient voltage based on voltage changes (e.g., increases) at output inductor 240. Controller 275 may also detect transient voltages when the voltage at output inductor 240 reaches a threshold value, when clamping diode 255 begins to conduct, or when clamping capacitor is charged to a threshold level. In one embodiment, controller 275 determines a time period necessary for clamping capacitor 260 to charge, once clamping diode begins to conduct current, or once a transient voltage has been generated or detected. In one embodiment, this time period is a fixed time period predetermined, for example, at the design stage of converter 100.

Figure 4:
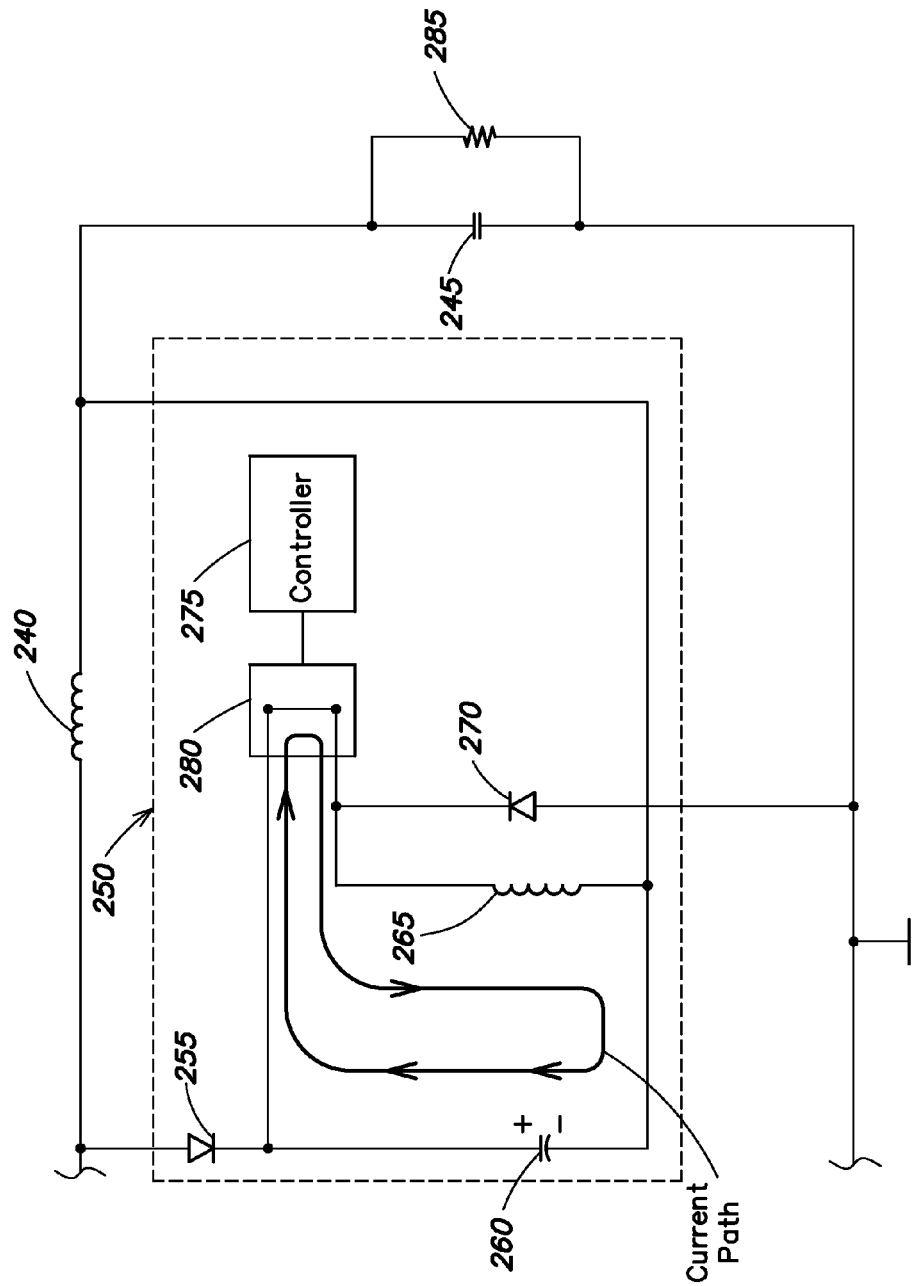
FIG. 4 is a schematic diagram depicting a converter when a charged clamping capacitor transfers energy to a recovery inductor in accordance with an embodiment.

FIG. 4 illustrates a portion of converter 100 when switch 280 is in a closed position and when energy is transferred from clamping capacitor 260 to recovery inductor 265. In one embodiment, when clamping capacitor 260 is charged, for example to 360V, controller 275 can provide a signal to switch 280 to change from the open position of FIG. 3 to the closed position of FIG. 4. This signal may be provided after expiration of a predetermined time period, (e.g., a time period during which clamping capacitor 260 is charged, due to the existence of a transient voltage. In one embodiment, switch 280 closes when clamping capacitor 255 voltage is at a maximum, peak, or predetermined voltage.

In one embodiment, the configuration of converter 100 as illustrated in FIG. 4 follows the configuration of converter 100 as illustrated in FIG. 3. For example, with respect to FIG. 3, clamping capacitor 260 is charged during a transient voltage condition of converter 100. When clamping capacitor 260 is charged, controller 275 may provide a pulse signal to switch 280 that changes the state of switch 280 from the open position of FIG. 3 to the closed position of FIG. 4. When switch 280 is closed, the electrical connection between clamping capacitor 260 and recovery inductor 265 causes current to follow the path indicated in FIG. 4. This transfers energy from clamping capacitor 260 to recovery inductor 265. Although the time for this energy transfer can vary, in one example substantially all of the energy is discharged from clamping capacitor 260 into recovery inductor 265 in 1.8 µs. In one embodiment, when clamping capacitor 260 has a voltage of substantially 360V, switch 280 closes, transferring energy to recovery inductor 265, for example until recovery inductor 265 has a voltage of 300V. Generally, current ramps up from zero to a level determined at the design phase and consistent with the current rating of switch 280 (e.g., a peak current of 0.8 A), and the time to discharge clamping capacitor 260 is consistent with the capacitance of clamping capacitor 260 (e.g., 4700 pF), inductance of recovery inductor 265 (e.g., 500 µH), and the duty cycle and frequency of converter 100. It is appreciated that other current, inductance, and capacitance values are possible.

Figure 5:
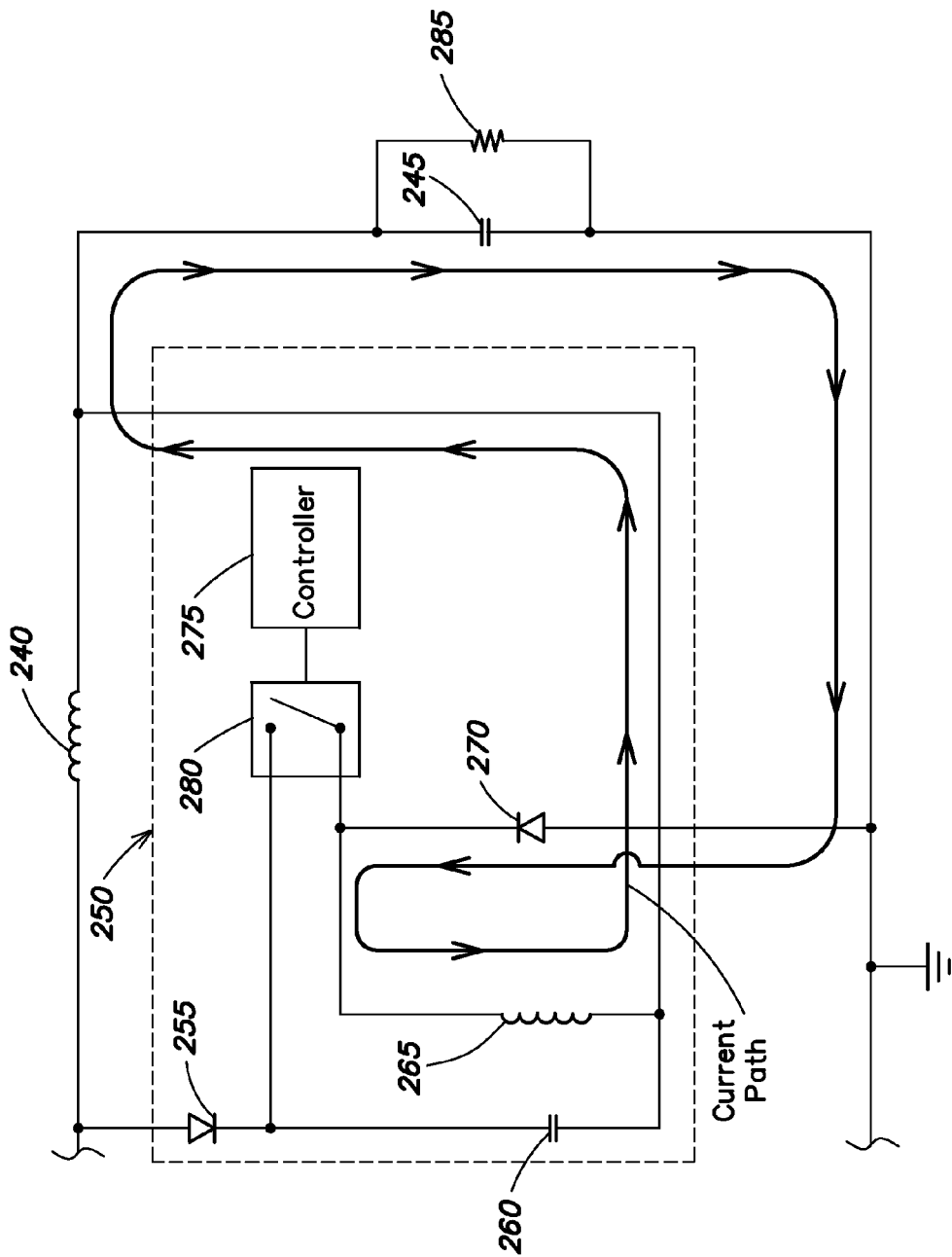
FIG. 5 is a schematic diagram depicting a converter when a recovery inductor transfers energy to converter output in accordance with an embodiment.

In one embodiment, after transfer of energy from clamping capacitor 260 to recovery inductor 265, switch 280 changes from the closed position as illustrated in FIG. 4 to the open position as illustrated in FIG. 5, which depicts a portion of converter 100 when switch 280 is in an open position and when energy is transferred from recovery inductor 265 to output capacitor 245. As indicated in FIG. 5, current follows a path through recovery inductor 265, recovery diode 270 and output capacitor 245, transferring energy from recovery inductor 265 to output capacitor 245 when switch 280 is open. For example controller 275 may include a timing circuit that causes switch 280 to open after or upon expiration of a time period where energy is transferred from clamping capacitor 260 to recovery inductor 265. In one embodiment, this time period includes a delay period based on or triggered by detection of the transient voltage spike. The time period during which switch 280 is closed, as in FIG. 4, can also be based on detection of output inductor voltage, clamping capacitor voltage, or recovery inductor voltage.

As illustrated in FIG. 5, clamping capacitor 260 is discharged to some lower value of voltage, having previously transferred energy to recovery inductor 265. With reference to FIGS. 3 and 5, when switch 280 is open with clamping capacitor 260 discharged to a lower voltage level, clamping capacitor 260 can be configured to receive charge when clamp circuit 250 clamps a subsequent transient voltage spike, for example when current is conducted through clamping diode 255 during another transient voltage. In one embodiment, this iterative charging of clamping capacitor 260 (e.g., the current path illustrated in FIG. 3) occurs concurrently with the charging of output capacitor 245 by recovery inductor 265 (e.g., the current as illustrated in FIG. 5). In other words, recovery inductor 265 can transfer energy (to converter 100 output) from a first transient voltage at the same time clamping capacitor 260 is charged with energy from a second transient voltage. These operations may, but need not be concurrent. For example, recovery inductor 265 can be fully discharged before the beginning of a new cycle and a subsequent charging of clamping capacitor 260.

In one embodiment, with respect to FIGS. 2-5, controller 275 determines that a voltage spike has started in converter 100, such as a transient voltage spike initiated after the reverse recovery period of at least one rectifier diode 235. Responsive to the determination of the transient voltage, switch 280 can be configured in an open position for the duration of a delay time period controlled by a timing circuit of controller 275. During this delay time period, the voltage at the output inductor may increase until is it clamped by clamp circuit 250 when clamping diode 255 begins to conduct current. This charges clamping capacitor with a voltage associated with the transient voltage spike during the delay time period. After expiration of the delay time period, controller 275 can send a pulse signal to switch 280, which changes the state of switch 280 from open to closed for another time period (or another part of the delay time period). When switch 280 is closed, energy from the transient voltage spike is transferred from clamping capacitor 260 to recovery inductor 265. Based, for example, on direct (e.g., measurements of inductor 265 characteristics) or indirect (e.g., after expiration of a predetermined time period) detection of this energy transfer, controller 275 can send a pulse signal to switch 280, which opens switch 280. When switch 280 is open and when recovery inductor 265 has stored energy from clamping capacitor 260, recovery diode 270 can begin to conduct, causing current from recovery inductor 265 to output capacitor 245, charging output capacitor 245 or load 285. In this example, at least some of the energy provided to output capacitor 245 from clamp circuit 250 is due to the transient voltage spike. This converter 100 operation may be iterative, so that energy from a plurality of transient voltages is applied in succession to output capacitor 245 and not, for example, dissipated as heat by resistors.

Further, in one embodiment, because clamp circuit 250 clamps transient voltage spikes, the power ratings of resistor 225 and capacitor 230 can be reduced, as snubber circuit 220 reduces ripple voltages from the secondary winding of transformer 205 without exposure to the potentially high transient voltages clamped or prevented by clamp circuit 250.

Figure 6:
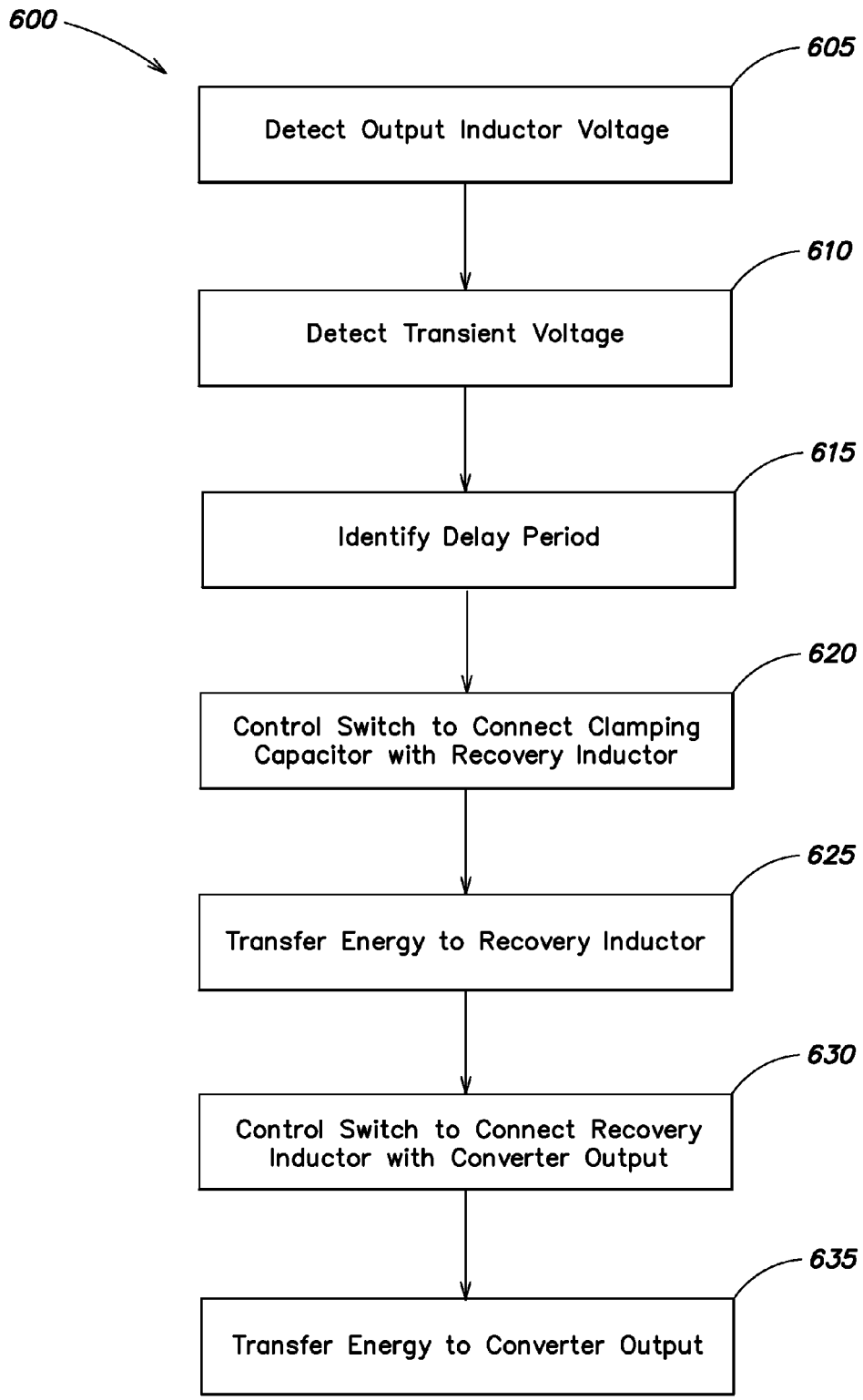
FIG. 6 is a flow chart depicting a method of operating a converter in accordance with an embodiment.

FIG. 6 is a flow chart depicting a method 600 of operating a converter, such as converter 100 as illustrated in FIGS. 1-5. In one embodiment, method 600 includes an act of detecting at least one output inductor voltage of a converter (ACT 605). Converter output inductor voltage may be detected (ACT 605) by a voltage detector or sensor associated with a controller. Method 600 can also include an act of detecting at least one transient voltage (ACT 610). For example, the detected output inductor voltage (ACT 605) can indicate the existence of a voltage spike, such as a transient voltage generated after the reverse recovery period of one or more converter diodes. A converter controller can process information regarding the detected (ACT 605) output inductor voltage, and identify a transient voltage within the converter (ACT 610).

In one embodiment, identifying transient voltages (ACT 610) can include determining that the detected (ACT 605) output inductor voltage is at or above a voltage that indicates the existence of a transient voltage or is at a predetermined maximum output inductor voltage. Identifying a transient voltage (ACT 610) can also include determining a rate of change of detected (ACT 605) output inductor voltages with time, where a rate of change above a threshold rate indicates the existence of a transient voltage. Detecting a transient voltage (ACT 610) may also include detecting converter diode reverse recovery periods, detecting current conduction at one or more clamping diodes of a clamp circuit associated with or included as part of the converter, or detecting charge at a clamping capacitor of the clamp circuit. In one embodiment, identifying a transient voltage (ACT 610) includes determining that the output inductor voltage is based on a transient voltage generated during a reverse recovery time period of at least one rectifier diode of the converter.

Method 600 in one embodiment includes an act of identifying at least one delay period (ACT 615). Identifying a delay period (ACT 615) may include identifying a time in which the transient voltage will at least partially charge the clamping capacitor of the clamp circuit. For example, current switching between rectifier diodes of the converter may generate a transient voltage that causes the clamping diode of the clamp circuit to conduct, charging the clamping capacitor that is electrically connected to the clamping diode. In one embodiment, identifying a delay period (ACT 615) includes identifying the time necessary for the transient voltage to charge the clamping capacitor. Further, time periods may be identified for switching purposes that indicate the time necessary to transfer energy from the clamping capacitor to the recovery inductor, and from the recovery inductor to the converter output.

Method 600 may include at least one act of controlling a switch to connect at least one clamping capacitor with at least one recovery inductor (ACT 620). In one embodiment, controlling the switch (ACT 620) may be based on the detected output inductor voltage (ACT 605) or transient voltage (ACT 610). For example, responsive to a detected output inductor voltage (ACT 605) or transient voltage (ACT 610), method 600 may control the clamp circuit switch to connect the clamping capacitor with the recovery inductor (ACT 620). In this example, energy from the clamping capacitor can be transferred to the recovery inductor.

In one embodiment, controlling the switch to connect the clamping capacitor with the recovery inductor (ACT 620) occurs after expiration of the identified (ACT 615) time period. For example, the transient voltage can be determined to charge the clamping capacitor within a time period of its generation or detection. Upon expiration of this time period, the clamping capacitor may be at least partially charged, and method 600 controls the switch (ACT 620) to connect the clamping capacitor with the recovery inductor.

In one embodiment, controlling the switch to connect the clamping capacitor with the recovery inductor (ACT 620) transfers at least some energy associated with the transient voltage to the clamping capacitor. The voltage of the clamping capacitor may be less than or equal to the transient voltage, and the output inductor voltage may be less than or equal to a peak value of the transient voltage.

In some embodiments, controlling the switch to connect the clamping capacitor with the recovery inductor (ACT 620) includes electrically connecting the clamping capacitor with the recovery inductor when a clamping capacitor voltage is substantially equal (e.g., within 10%) to a threshold voltage associated with the transient voltage.

Method 600 may also include at least one act of transferring energy to the recovery inductor (ACT 625). In one embodiment, controlling the switch to connect the clamping capacitor and recovery inductor (ACT 620) causes the transfer of energy from the clamping capacitor to the recovery inductor (ACT 625) and may occur after expiration of a predetermined time period. Transferring energy from the clamping capacitor to the recovery inductor (ACT 625) generally includes completing a circuit between the clamping capacitor and recovery inductor when the clamping capacitor is at least partially charged. In this example, the clamping capacitor may discharge, transferring energy to the recovery inductor. This completed circuit may have one or more intervening elements in addition to the clamping capacitor and recovery inductor, such as one or more switch, controller, or diode.

In one embodiment, method 600 includes an act of controlling the switch to connect the recovery inductor with the converter output (ACT 630). Controlling the switch to connect the recovery inductor with the converter output (ACT 630) may include connecting the recovery inductor with an output capacitor of the converter, or with a load. In one embodiment, controlling the switch to connect the recovery inductor with the converter output (ACT 630) is subsequent to controlling the switch to connect the clamping capacitor with the recovery inductor (ACT 620) or subsequent to transferring energy to the recovery inductor (ACT 625). For example, controlling act (ACT 630) may be subsequent to controlling act (ACT 620) by a predetermined time period. This time period may be based on detection of the transient voltage, or other factors such as a detected state of converter elements, e.g., clamping capacitor voltage, clamping diode conduction, or output inductor voltage.

Method 600 may also include at least one act of transferring energy to the converter output (ACT 635). Transferring this energy (ACT 635) may occur subsequent to a switch changing states as part of the act of controlling the switch to connect the recovery inductor with the converter output (ACT 630). For example, energy may transfer from the recovery inductor to the output capacitor of the converter through a circuit that includes at least one diode.

Note that in FIGS. 1 through 6, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both)), non-volatile memory, tape, a system memory, and a computer hard drive.

From the foregoing, it will be appreciated that the aspects and embodiments provided by the systems and methods described herein afford an effective way to control converters that may form part of an uninterruptable power supply. The systems and methods according to various embodiments are able to capture energy associated with transient voltages and provide this energy to the output of the converter. This increases efficiency, saves energy, prevents converter component degradation and resistor based energy dissipation (e.g., heat loss) and lowers cost.

Any references to front and back, left and right, top and bottom, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, components shown or described as being directly coupled may also be indirectly coupled through other components. Further, controller 125 and controller 275 may be the same or different controllers, and inverter 115 and converter 100 may be separate circuits or part of a same circuit. Also, energy transferred between converter components may be in the form of electrical power, or voltage or current transfers.

The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A voltage converter, comprising:

a rectifier circuit;

an output inductor and an output capacitor coupled to the rectifier circuit;

a clamp circuit having:

a clamping diode and a clamping capacitor coupled in a serial combination with the serial combination coupled in parallel with the output inductor;

a recovery inductor coupled to the output capacitor; and a switch configured to selectively couple and decouple the recovery inductor in parallel with the clamping capacitor;

wherein the recovery inductor is configured to discharge current to the output capacitor through a current path bypassing the switch.

2. The converter of claim 1, wherein the rectifier circuit comprises:

a full wave rectifier circuit having a first diode, a second diode, a third diode, and a fourth diode; and a snubber circuit having a resistor and a capacitor, a first terminal of the snubber circuit coupled to an anode of the first diode and a cathode of the second diode, a second terminal of the snubber circuit coupled to an anode of the third diode and a cathode of the fourth diode.

3. The converter of claim 2, wherein the clamping diode is configured to conduct a current when a voltage of the output inductor is substantially equal to a predetermined voltage.

4. The converter of claim 2, wherein the clamping diode is configured to conduct a current when a voltage of at least one of the first, second, third, and fourth diodes is substantially equal to a predetermined threshold voltage associated with a transient voltage.

5. The converter of claim 1, wherein the converter is configured such that a voltage of the output inductor is less than a peak value of a transient voltage.

6. The converter of claim 4, comprising:
a controller configured to change a state of the switch from an open position to a closed position when a voltage of the clamping capacitor is based on the transient voltage.

7. The converter of claim 6, wherein the controller is configured to change a state of the switch from a closed position to an open position when a voltage of the recovery inductor is based on the transient voltage.

8. The converter of claim 1, wherein the clamp circuit further comprises a recovery diode, a cathode of the recovery diode coupled to the recovery inductor and to the switch, and an anode of the recovery diode coupled to the output capacitor.

9. The converter of claim 8, wherein the recovery diode is configured to conduct a current when a voltage of the recovery inductor is based on the transient voltage and when the switch is in an open position.

10. The converter of claim 8, wherein the recovery inductor and the recovery diode are configured in operation of the converter to transfer energy to the output capacitor when the switch is in an open position.

11. An uninterruptable power supply, comprising:
an AC power input;
a battery;
an output configured to provide power from at least one of the AC power input and the battery to an uninterruptable power supply output;
a DC/DC converter coupled to the battery, wherein the DC/DC converter includes:
a rectifier circuit;
an output inductor and an output capacitor coupled to the rectifier circuit; and
a clamp circuit having:
a clamping diode and a clamping capacitor coupled in a serial combination with the serial combination coupled in parallel with the output inductor;
a recovery inductor coupled to the output capacitor; and
a switch configured to selectively couple and decouple the recovery inductor in parallel with the clamping capacitor;
wherein the recovery inductor is configured to discharge current to the output capacitor through a current path bypassing the switch.

* * * * *